US011511371B2

(12) United States Patent
Hioki et al.

(10) Patent No.: US 11,511,371 B2
(45) Date of Patent: Nov. 29, 2022

(54) LASER WELDING METHOD

(71) Applicant: TOYOTA JIDOSHA KABUSHIKI KAISHA, Toyota (JP)

(72) Inventors: Toru Hioki, Nisshin (JP); Shuhei Ogura, Nagakute (JP); Atsushi Kawakita, Miyoshi (JP); Koki Nakada, Toyota (JP); Takashi Goto, Toyota (JP); Ryosuke Kawai, Okazaki (JP)

(73) Assignee: TOYOTA JTDOSHA KABUSHIKI KAISHA, Toyota (JP)

( * ) Notice: Subject to any disclaimer, the term of this patent is extended or adjusted under 35 U.S.C. 154(b) by 163 days.

(21) Appl. No.: 16/426,789

(22) Filed: May 30, 2019

(65) Prior Publication Data
US 2019/0366479 A1 Dec. 5, 2019

(30) Foreign Application Priority Data
Jun. 4, 2018 (JP) .............................. JP2018-106990

(51) Int. Cl.
*B23K 26/22* (2006.01)
*B23K 26/03* (2006.01)
(Continued)

(52) U.S. Cl.
CPC ............ *B23K 26/22* (2013.01); *B23K 26/032* (2013.01); *B23K 26/0648* (2013.01);
(Continued)

(58) Field of Classification Search
CPC ............ B23K 2103/10; B23K 20/2336; B23K 26/244; B23K 26/354; B23K 35/286; B23K 11/185; B23K 20/1265; B23K 20/1235
See application file for complete search history.

(56) References Cited

U.S. PATENT DOCUMENTS

| | | | | |
|---|---|---|---|---|
| 2017/0106470 A1* | 4/2017 | Solomon | ................. | B23K 26/22 |
| 2018/0214983 A1* | 8/2018 | Yang | ................... | B23K 26/082 |
| 2019/0061056 A1* | 2/2019 | Yang | .................... | B23K 26/322 |

FOREIGN PATENT DOCUMENTS

| | | |
|---|---|---|
| CN | 106862757 A | 6/2017 |
| CN | 107900519 A | 4/2018 |

(Continued)

OTHER PUBLICATIONS

Xiao et al., "Porosity characterization in laser welds of Al Li alloy 1420", Applied Laser, vol. 27, No. 1, pp. 13-17, Feb. 2007 (6 pages total).

*Primary Examiner* — Thien S Tran
(74) *Attorney, Agent, or Firm* — Sughrue Mion, PLLC

(57) ABSTRACT

In a laser welding method, generation of relatively large blow holes in a welding part is prevented while decrease in productivity is reduced. The laser welding method for lap welding, using a laser beam LB, of a plurality of metal plates and including an aluminum alloy cast plate includes: a melting path of scanning and irradiating circularly a superimposed part of the aluminum alloy plate and the aluminum alloy cast plate with a first laser beam LB1 to form a molten pool of the molten aluminum alloy plate and the molten aluminum alloy cast plate; and a stirring path of scanning and irradiating circularly the molten pool with a second laser beam LB2 having a scanning speed $V_2$ faster than a scanning speed $V_1$ of the first laser beam LB1 to stir the molten pool.

6 Claims, 8 Drawing Sheets

(51) Int. Cl.
*B23K 26/06* (2014.01)
*B23K 26/073* (2006.01)
*B23K 26/32* (2014.01)
*B23K 103/10* (2006.01)

(52) U.S. Cl.
CPC ............ *B23K 26/073* (2013.01); *B23K 26/32* (2013.01); *B23K 2103/10* (2018.08)

(56) References Cited

FOREIGN PATENT DOCUMENTS

| | | | | |
|---|---|---|---|---|
| JP | 7-171690 A | 7/1995 | | |
| JP | 11-138282 A | 5/1999 | | |
| JP | 2005-205415 A | 8/2005 | | |
| JP | 2010-94701 A | 4/2010 | | |
| JP | 2012-115876 A | 6/2012 | | |
| JP | 2012115876 A * | 6/2012 | | |
| WO | WO-2017035729 A1 * | 3/2017 | ........... | B23K 26/082 |
| WO | 2017/156723 A1 | 9/2017 | | |
| WO | WO-2017156723 A1 * | 9/2017 | ........... | B23K 26/073 |

* cited by examiner

| Path | Irradiation Conditions | | | |
|---|---|---|---|---|
| | Laser Output | Scanning Speed | Scanning Radius | Melting Radius |
| Melting Path | $P_1$ | $V_1$ | $r_1$ | $R_1$ |
| Stirring Path | $P_2$ | $V_2$ | $r_2$ | $R_2$ |

LASER WELDING METHOD

CROSS-REFERENCE TO RELATED APPLICATIONS

The present application claims priority under 35 U.S.C. § 119(a) to Japanese Patent Application No. 2018-106990, filed on Jun. 4, 2018. The contents of this application are incorporated herein by reference in its entirety.

TECHNICAL FIELD

The present invention relates to a laser welding method, and particularly to a laser welding method for lap welding, using a laser beam, of a plurality of metal plates including an aluminum alloy casting.

BACKGROUND ART

Generally, it is considered that the aluminum alloy casting is not suitable for welding compared to an aluminum alloy formed by, for example, rolling, because when the aluminum alloy casting is used as a material to be welded to perform welding, a large amount of gas, which was forcibly dissolved as a solid solution in the aluminum alloy casting at the time of casting, appears as large bubbles in the molten part, and the large bubbles that cannot be discharged before the molten part congeals remain as large blow holes (also called as "porosities") in the welding part. Therefore, the quality (mainly the strength) of the welding part is degraded.

Patent Document 1 discloses, for example, a welding method as a combination of arc welding with laser welding for welding an aluminum alloy casting, in which a molten pool that is formed on the surface of a welding base metal by arc welding is irradiated with a laser beam so that the molten pool is prevented from being rapidly cooled and that the period of time is ensured to discharge the bubbles from the molten pool. Thus, generation of the blow holes are prevented.

PRIOR ART DOCUMENT

Patent Document

[Patent Document 1] JP 2005-205415 A

SUMMARY OF THE INVENTION

Problem to be Solved by the Invention

When a plurality of metal plates is subjected to lap welding using the laser beam, if the plurality of metal plates includes an aluminum alloy casting, large blow holes are generated in the welding part because of a large amount of gas forcibly dissolved as a solid solution in the aluminum alloy casting. Thus, the quality of the welding part is degraded.

In terms of the above, it may be considered to apply the method disclosed in Patent Document 1 to the lap welding of a plurality of metal plates including an aluminum alloy casting using the laser beam. That is, a molten pool formed by the plurality of molten metal plates is continuously irradiated with the laser beam so that the molten pool is prevented from being rapidly cooled and that the period of time is ensured to discharge the bubbles from the molten pool.

However, the lap welding has normally a deep molten pool, therefore with such a method, it takes long time to discharge the bubbles from the molten pool. Thus, there is a room for improvement in respect of preventing decrease in productivity.

The present invention was made in consideration of the above circumstances, an object of which is to provide a laser welding method for lap welding of a plurality of metal plates including an aluminum alloy casting, in which generation of relatively large blow holes in a welding part is reduced while decrease in productivity is reduced.

Means for Solving the Problem

In order to achieve the above object, in the laser welding method of the present invention, a molten pool is stirred by a laser beam having a relatively high scanning speed so that relatively large bubbles that appear in the molten pool are broken and miniaturized.

Specifically, the present invention is directed to a laser welding method for lap welding, using a laser beam, of a plurality of metal plates including at least one aluminum alloy casting.

The above-described laser welding method includes: a melting step of scanning and irradiating circularly a superimposed part made by superimposing the plurality of metal plates with a first laser beam so as to form a molten pool made from the plurality of molten metal plates; and a stirring step of scanning and irradiating circularly the molten pool with a second laser beam having a scanning speed faster than a scanning speed of the first laser beam so as to stir the molten pool.

In this configuration, since the plurality of metal plate includes at least one aluminum alloy casting, when the plurality of metal plates is molten by the irradiation with the first laser beam in the melting step, a large amount of gas, which was forcibly dissolved as a solid solution in the aluminum alloy casting at the time of casting, appears as relatively large bubbles in the molten pool.

However, in this configuration, the molten pool is circularly scanned and irradiated with the second laser beam having the scanning speed faster than the scanning speed of the first laser beam in the stirring step. Accordingly, the molten pool is also stirred at a relatively high speed, and the relatively large bubbles that appear in the molten pool are broken and miniaturized. Therefore, it is possible to prevent generation of the relatively large blow holes in the welding part at the time of congelation of the molten pool, which can also prevent degradation of the quality (mainly, the strength) of the welding part.

Furthermore, unlike the method in which the laser beam is continuously emitted in order to ensure the period of time for discharging the bubbles from the molten pool, in this configuration, the molten pool is stirred at a relatively high speed so as to miniaturize the bubbles. Thus, it is not necessary to wait for the bubbles to be discharged from the molten pool, which contributes to prevention of reduction in productivity.

Also in the above-described laser welding method, it is preferable that the scanning is performed with the second laser beam in such a manner that the molten pool is not expanded.

In the present invention, the term "in such a manner that the molten pool is not expanded" includes not only a case in which the melting area by the second laser beam is equal to or smaller than the melting area by the first laser beam, but also a case in which the melting area is not expanded unnecessarily, even if it is larger than the melting area of the first laser beam.

In the stirring step of miniaturizing the bubbles, when the molten pool is largely expanded, i.e. when a large amount of aluminum alloy casting is newly molten, the bubbles newly appear in the molten pool. However, with this configuration, the scanning is performed, with the second laser beam so as to stir molten pool, in such a manner that the molten pool is not unnecessarily expanded. Thus, it is possible to miniaturize the bubbles while preventing new bubbles from appearing in the molten pool.

Also, in the above-described laser welding method, it is preferable that the second laser beam is emitted outside the scanning locus of the first laser beam.

The bubbles that become the relatively large blow holes at the time of congelation of the molten pool are likely to concentrate at the solid-liquid interface, i.e. the interface where the molten part comes into contact with the aluminum alloy casting. With the above-described configuration, the second laser beam that stirs the molten pool is emitted outside the scanning locus of the first laser beam. Thus, it is possible to effectively break and miniaturize the relatively large bubbles that are likely to concentrate at the solid-liquid interface.

In addition, if the spot diameter of the second laser beam is set, for example, smaller than the spot diameter of the first laser beam, the molten pool is not largely expanded even when the second laser beam is emitted outside the scanning locus of the first laser beam. Thus, this configuration does not contradict prevention of expansion of the molten pool.

Also, it is preferable that the above-described laser welding method does not include a step of irradiating, with the laser beam, a part inside the scanning locus of the first laser beam and the scanning locus of the second laser beam.

As described above, the bubbles that become the relatively large blow holes at the time of congelation of the molten pool are likely to concentrate at the solid-liquid interface. The above-described configuration does not include a step of irradiating, with the laser beam, the part inside the scanning locus of the first laser beam and the scanning locus of the second laser beam. In other words, the irradiation with the laser beam, which hardly contributes to miniaturization of the bubbles, is not performed. Thus, it is possible to reduce work hours and to improve work efficiency.

Also in the above-described laser welding method, it is preferable that the plurality of metal plate is constituted of an aluminum alloy cast plate and an aluminum alloy plate.

Since this configuration has a relatively high thermal conductivity, the molten pool is likely to be rapidly solidified. Thus, it is possible to suitably prevent the relatively large blow holes from being generated in the welding part even when the aluminum alloys are subjected to the lap welding, although the lap welding of the aluminum alloys normally causes the relatively large bubbles to remain at the time of congelation.

Advantageous Effect of the Invention

As described above, with the laser welding method of the present invention, lap welding of a plurality of metal plates including an aluminum alloy casting can be performed in such a manner that generation of relatively large blow holes in a welding part is reduced while decrease in productivity is reduced.

BRIEF DESCRIPTION OF THE DRAWINGS

FIG. 1(a) is a schematic cross-sectional view of the joining part welded by a laser welding method according to an embodiment of the present invention. FIG. 1(b) is a schematic cross-sectional view of the joining part welded by a conventional laser welding method.

FIG. 7(a) is a diagram related to a melting path. FIG. 7(b) is a diagram related to a stirring path.

FIG. 10(a) is a cross-section in an example of the present invention. FIG. 10(b) is a cross-section in a comparative example.

DESCRIPTION OF EMBODIMENT

Hereinafter, an embodiment of the present invention will be described with reference to the drawings.

Figure 1:
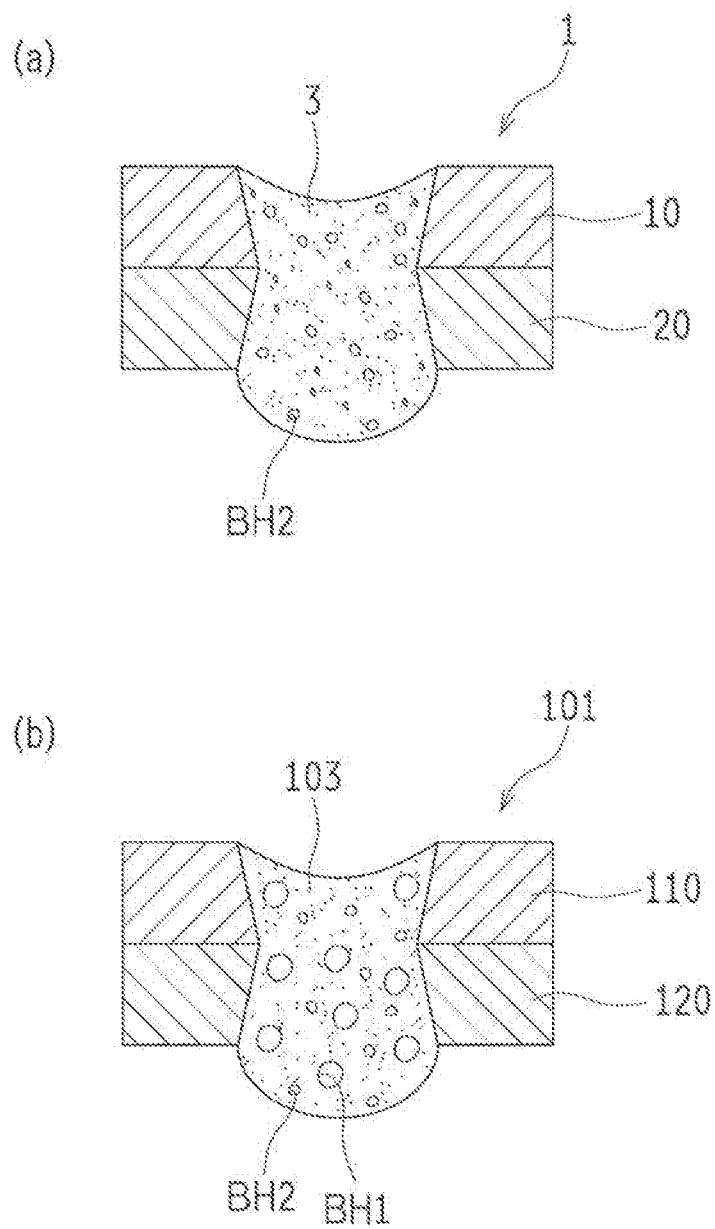
FIG. 1 are cross-sectional views each schematically illustrating a joining part of an aluminum alloy plate and an aluminum alloy cast plate.

FIG. 1(a) is a cross-sectional view schematically illustrating a joining part 1 of an aluminum alloy plate 10 and an aluminum alloy cast plate 20 welded by the laser welding method according to this embodiment. FIG. 1(b) is a cross-sectional view schematically illustrating a joining part 101 of an aluminum alloy plate 110 and an aluminum alloy cast plate 120 welded by the conventional laser welding method. As shown in FIGS. 1(a) and 1(b), the joining part 1 according to this embodiment and the conventional joining part 101 are formed in the same manner, i.e. the joining parts 1 and 101 are formed, respectively, by vertically coupling the upper aluminum alloy plates 10 and 110 formed by rolling or the like to the lower aluminum alloy cast plates 20 and 120 via the welding parts 3 and 103 formed by laser welding.

However, in the welding part 103 of the conventional joining part 101, a large number of relatively large blow holes BH1 remain in addition to relatively small blow holes BH2, as shown in FIG. 1(b). In contrast, in the welding part 3 of the joining part 1 according to this embodiment, only relatively small blow holes BH2 remain, as shown in FIG. 1(a).

The above blow hole (gas cavity) is also called as "porosity". The relatively large blow holes BH1 that exist in the welding parts 3 and 103 may cause degradation of shear strength, tensile strength, fatigue strength and the like of the welding parts 3 and 103. In this respect, only the relatively small blow holes BH2 that are miniaturized remain in the welding part 3 according to this embodiment. Thus, compared to the conventional welding part 103, the quality (mainly, strength) of the welding part 3 is not likely to be affected by the relatively large blow holes BH1. Hereinafter, the laser welding method according to this embodiment is described in detail, in which the relatively large blow hole BH1 does not remain in the welding part 3.

—Laser Welding Apparatus—

Figure 2:
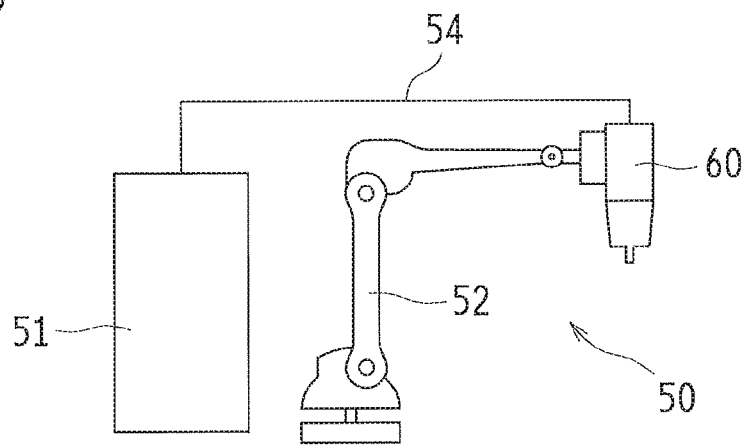
FIG. 2 are configuration diagrams schematically illustrating a laser welding apparatus to perform the laser welding method.
Figure 2:
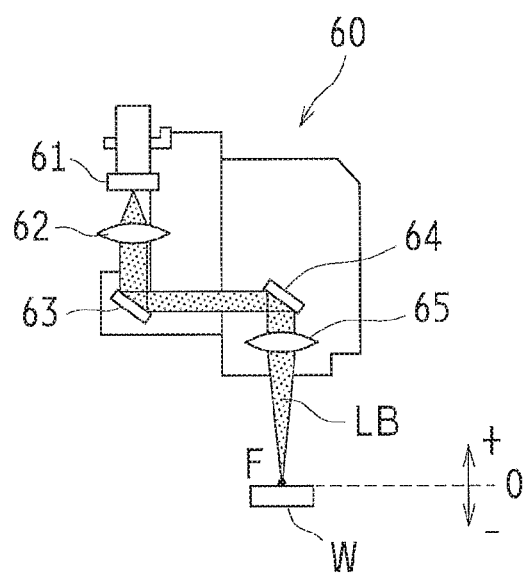

FIG. 2 are configuration diagrams schematically illustrating a laser welding apparatus 50 to perform the laser welding method of this embodiment. The laser welding apparatus 50 is configured as a remote laser that performs laser welding by irradiating a workpiece W (i.e. the aluminum alloy plate 10 and the aluminum alloy cast plate 20 in this embodiment) with a laser beam LB from a position separated from the workpiece W. As shown in FIG. 2(*a*), the laser welding apparatus 50 includes: a laser oscillator 51 that outputs the laser beam LB; a robot 52; and a 3D scanner 60 that scans the laser beam LB supplied, via a fiber cable 54, from the laser oscillator 51 so as to irradiate the workpiece W. The robot 52 is an articulated robot having a plurality of joints driven by a plurality of servomotors (not shown), and is configured to move the 3D scanner 60 that is attached to a tip part thereof according to instructions from a control device (not shown).

As shown in FIG. 2(*b*), the 3D scanner 60 includes: a sensor 61; a collecting lens 62; a stationary mirror 63; a movable mirror 64; and a converging lens 65. The laser beam LB supplied from the laser oscillator 51 to the 3D scanner 60 is emitted from the sensor 61 to the collecting lens 62 and collected by the collecting lens 62. After that, the collected laser beam LB is reflected by the stationary mirror 63 toward the movable mirror 64 that changes the direction of the laser beam LB. Then, the laser beam LB passes through the converging lens 65 so that the laser beam with a predetermined spot diameter is emitted toward the workpiece W. By the above-described configuration of the laser welding apparatus 50 of this embodiment, the movable mirror 64 is driven according to the instructions from the control device (not shown), thus the 3D scanner 60 can irradiate, with the laser beam LB, a predetermined area within a radius of 200 mm in a state in which the 3D scanner 60 is separated from the workpiece W by 500 mm.

The collecting lens 62 is movable in the vertical direction by an actuator (not shown). Thus, the focal length is adjusted in the vertical direction by moving the collecting lens 62 in the vertical direction. In this way, in the laser welding apparatus 50 of this embodiment, when the upper surface of the workpiece W is set to a reference (zero; 0), it is possible to easily realize a defocus state in which the focus F is above the workpiece W by shifting the focus F in the + direction and also to easily realize an in-focus state in which the focus F is below the workpiece W by shifting the focus F in the − direction.

—Mechanism of Generation of Blow Holes—

Before the description of the laser welding method of this embodiment, a description is given on mechanism of generation of the blow holes BH1 and BH2, and also on problems caused by the above blow holes in the conventional laser welding method, which will facilitate comprehension of the present invention.

Figure 3:
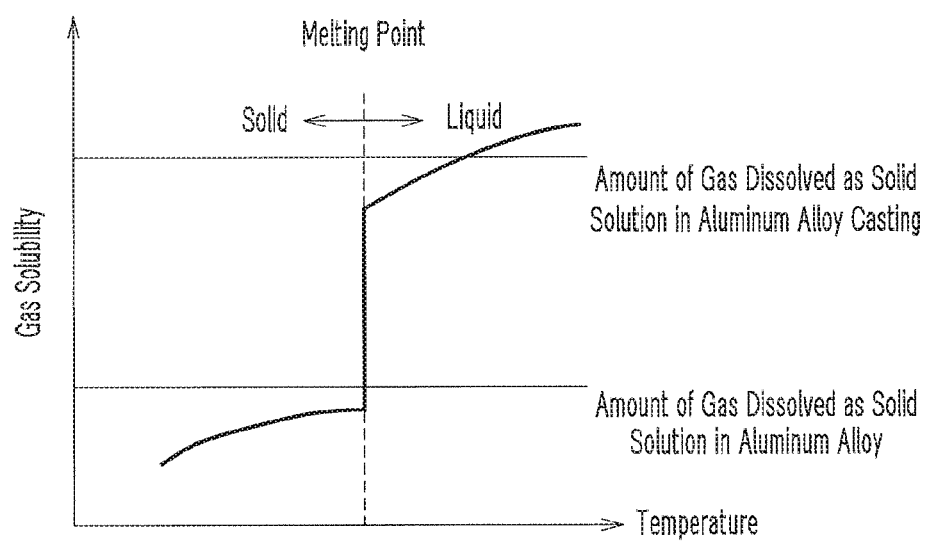
FIG. 3 is a conceptual graph schematically indicating gas solubility in an aluminum alloy material.

FIG. 3 is a conceptual graph schematically indicating gas solubility in an aluminum alloy material. Generally, it is considered that the aluminum alloy casting is not suitable for the welding compared to the aluminum alloy formed by, for example, rolling. This is because a large amount of gas is dissolved as a solid solution in the aluminum alloy casting (i.e. a large amount of gas enters the aluminum crystal structure and mixed with the aluminum in a solid state with the original aluminum structure being maintained).

More specifically, as shown in FIG. 3, the amount of gas that is forcibly dissolved as a solid solution in the aluminum alloy casting at the time of casting is larger than the amount of gas that is dissolved as a solid solution in the aluminum alloy (at least twenty times or more). Therefore, when the aluminum alloy casting is molten at the time of welding, the solid-dissolved gas appears, as relatively large bubbles, in the molten part. Thus appeared relatively large bubbles in the molten part remain in the welding part as the relatively large blow holes BH1, unless they are discharged at the time of congelation. The remaining amount of relatively large blow holes BH1 causes variations in the strength of the welding part, which leads to difficulty in obtaining the joining part with a stable quality. Thus, the aluminum alloy casting is considered to be unsuitable for the welding.

Figure 12:
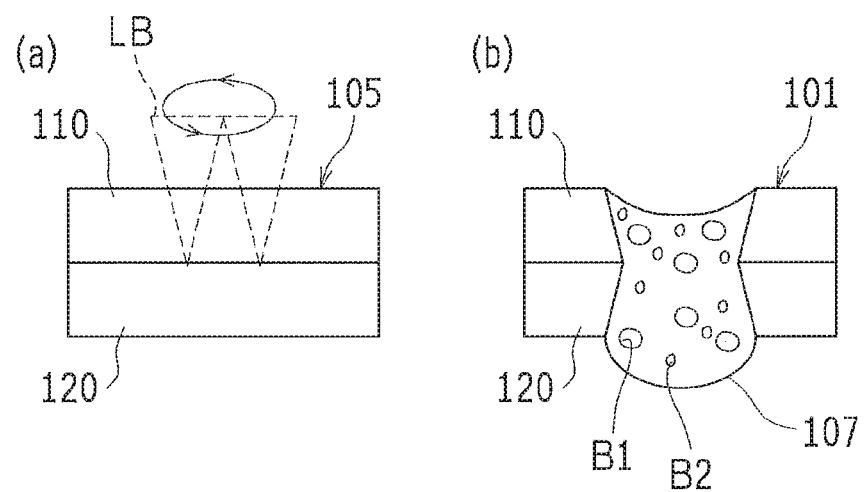
FIG. 12 are diagrams schematically illustrating a laser welding method according to a conventional example 1.
Figure 13:
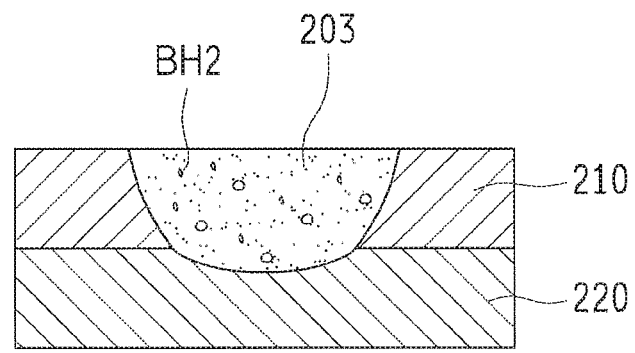
FIG. 13 is a cross-sectional view schematically illustrating a welding part of an aluminum alloy plate and an aluminum alloy cast plate welded by a laser welding method according to a conventional example 2.

These relatively large blow holes BH1 may also be generated at the time of lap welding, with the laser beam LB, of a plurality of metal plates including at least one aluminum alloy casting. FIG. 12 are diagrams schematically illustrating a laser welding method according to a conventional example 1. FIG. 13 is a cross-sectional view schematically illustrating a welding part 203 of the aluminum alloy plate 210 and the aluminum alloy cast plate 220 welded by a laser welding method according to a conventional example 2.

For example, a superimposed part 105, which is made by superimposing aluminum alloy plate 110 on the aluminum alloy cast plate 120 in the vertical direction, is circularly scanned and irradiated with the laser beam LB, as shown in FIG. 12(*a*). Thus, a molten pool 107 is formed by the molten aluminum alloy plate 110 and the molten aluminum alloy cast plate 120 as shown in FIG. 12(*b*), and in this molten pool 107, the solid-dissolved gas in the aluminum alloy cast plate 120 appears as the relatively large bubbles B1 and the relatively small bubbles B2.

Here, it may be considered that the molten pool 107 is continuously irradiated with the laser beam LB so as to prevent the molten pool 107 from being rapidly cooled and to ensure the period of time to discharge the bubbles B1 and B2 from the molten pool 107. However, the lap welding normally has a deep molten pool 107, therefore with such a method, it takes long time to discharge the bubbles B1 and B2 from the molten pool 107. Thus, there is a room for improvement in respect of preventing decrease in productivity.

Also it may be considered to join the plurality of metal plates including at least one aluminum alloy casting by a mechanical joining method using self-piercing rivets or flow drill screws. However, this method requires to use subsidiary materials, which leads to increase in running costs and cycle times compared to the laser welding method.

In consideration of the above, it may be considered to form the welding part 203 that penetrates the aluminum alloy plate 210 but does not penetrate the aluminum alloy cast plate 220, as shown in FIG. 13, so that the melting amount of the aluminum alloy cast plate 220, which generates the bubbles B1 and B2, is reduced. With this method in the conventional example 2, only the relatively small blow holes BH2 remain in the welding part 203, as shown in FIG.

13. Thus, it is possible to prevent the strength and the like from being affected by the relatively large blow holes BH1 compared to the welding part 103 in the conventional example 1.

However, in this method in the conventional example 2, the output range of the laser beam is limited so as not to penetrate the aluminum alloy cast plate 220, which leads to a low power tolerance. Also, when the gap between the aluminum alloy plate 210 and the aluminum alloy cast plate 220 is large, it is difficult to perform welding. Furthermore, it is difficult to confirm the state of laser emission or the quality of the welding part 203 from the side of the aluminum alloy cast plate 220.

—Laser Welding Method—

Figure 5:
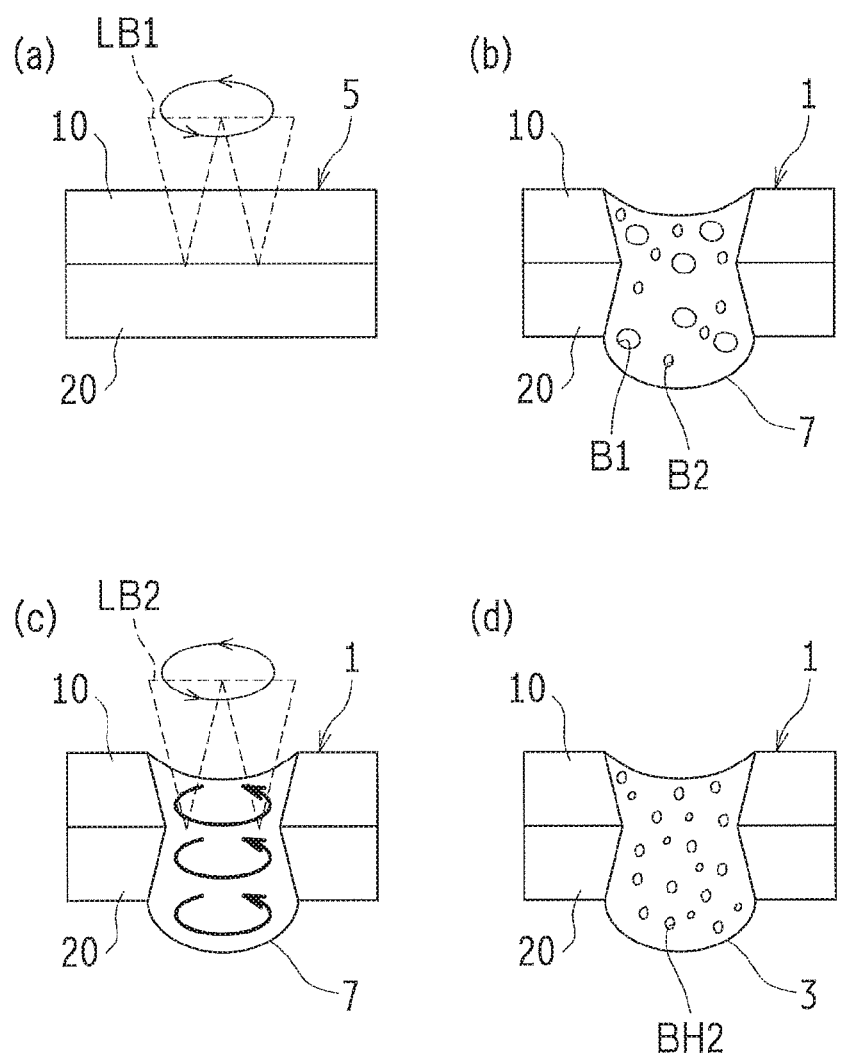
FIG. 5 are diagrams schematically explaining the laser welding method.

In this embodiment, in the laser welding method for lap welding, using the laser beam LB, of a plurality of metal plates including at least one aluminum alloy casting 1, the molten pool is stirred by the laser beam LB having a relatively high scanning speed so that the relatively large bubbles B1 that appear in the molten pool are broken. Specifically, as shown in FIG. 5, the laser welding method in this embodiment includes: a melting path (melting step) of scanning and irradiating circularly a superimposed part 5 made by superimposing the aluminum alloy plate 10 on the aluminum alloy cast plate 20 with a first laser beam LB1 so as to form a molten pool 7 made from the molten aluminum alloy plate 10 and the molten aluminum alloy cast plate 20; and a stirring path (stirring step) of scanning and irradiating circularly the molten pool 7 with a second laser beam LB2 having a scanning speed $V_2$ faster than a scanning speed $V_1$ of the first laser beam LB1 so as to stir the molten pool 7. Hereinafter, this laser welding method is described.

Figure 4:
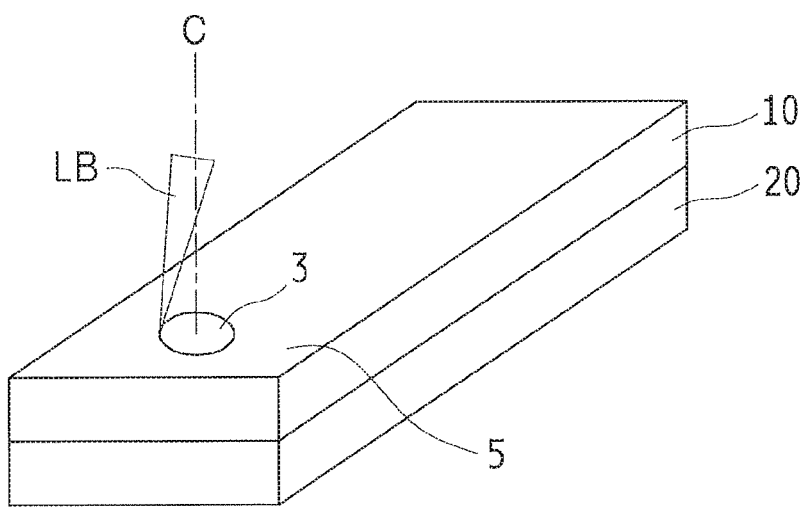
FIG. 4 is a perspective view schematically illustrating basic irradiation with a laser beam.

FIG. 4 is a perspective view schematically illustrating basic irradiation with the laser beam LB. In this embodiment shown in FIG. 4, remote laser welding is performed, more specifically, the laser beam LB is emitted from the laser welding apparatus 50 to the superimposed part 5 made by superimposing the aluminum alloy plate 10 on the aluminum alloy cast plate 20 such that the irradiation is performed from a position separated from the aluminum alloy plate 10 and the aluminum alloy cast plate 20. Thus, the aluminum alloy plate 10 and the aluminum alloy cast plate 20 are welded to each other. At this time, the welding part 3 is formed by being circularly scanned and irradiated with the laser beam LB by a method so-called "Laser Screw Welding" (LSW). In particular, as shown in FIG. 4, the part around a central axis C is scanned with the laser beam LB in such a manner that the irradiation is performed multiple times on concentric circles while changing the scanning speed, the output power, the scanning radius, the spot diameter, the number of rotations and the like. Thus, the welding part 3 is formed.

FIG. 5 are diagrams schematically explaining the laser welding method. Based on the above-described irradiation, the laser welding method of this embodiment includes: the melting path of irradiating the superimposed part 5 with the first laser beam LB1 so as to form the molten pool 7; and the stirring path of irradiating the molten pool 7 with the second laser beam LB2 so as to stir the molten pool 7.

In the melting path, the superimposed part 5, which is made by superimposing the aluminum alloy plate 10 on the aluminum alloy cast plate 20 in the vertical direction, is circularly scanned and irradiated with the first laser beam LB1, as shown in FIG. 5(a). Thus, the molten pool 7 is formed by the molten aluminum alloy plate 10 and the molten aluminum alloy cast plate 20 as shown in FIG. 5(b), and in this molten pool 7, the solid-dissolved gas in the aluminum alloy cast plate 20 appears as the relatively large bubbles B1 and the relatively small bubbles B2.

Then, in the stirring path, the molten pool 7 including the relatively large bubbles B1 and the relatively small bubbles B2 is circularly scanned and irradiated with the second laser beam LB2 having the scanning speed faster than the scanning speed of the first laser beam LB1 so as to stir the molten pool 7, as shown in FIG. 5(c). Thus, the relatively large bubbles B1 are broken and miniaturized.

In the stirring path, when the molten pool 7 congeals in the state in which the bubbles B1 are miniaturized, only the relatively small blow holes BH2 remain in the welding part 3 after the molten pool 7 congeals, as shown in FIG. 5(d). Thus, it is possible to prevent the quality of the welding part 3 from being affected by the relatively large blow holes BH1.

—Irradiation Conditions—

As described above, in the laser welding method of this embodiment, basically, the welding part 3 is irradiated with the second laser beam LB2 having a relatively fast scanning speed, which prevents the quality of the welding part 3 from being degraded due to the relatively large blow holes BH1. In addition to the above, the laser welding can be performed further efficiently by setting the following irradiation conditions.

Figures 6, 7:
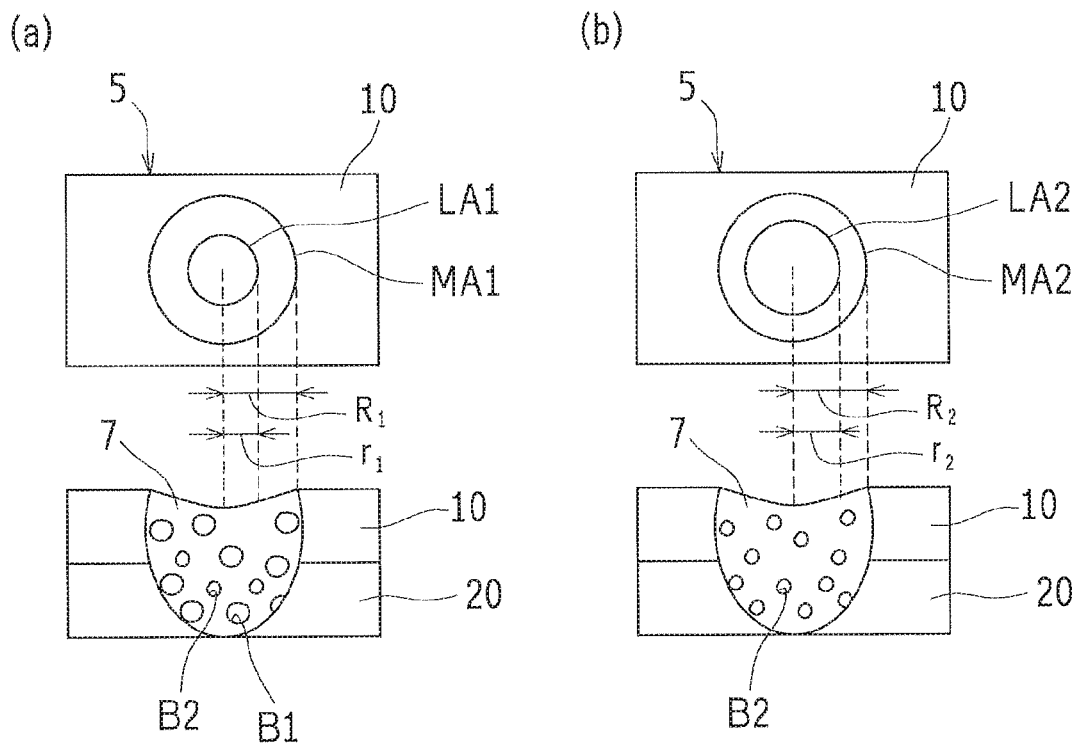
FIG. 6 is a table indicating conditions of irradiation with the laser beam.
FIG. 7 are diagrams schematically explaining the conditions of irradiation with the laser beam.

FIG. 6 is a table indicating conditions of irradiation with the laser beam LB. FIG. 7 are diagrams schematically explaining the conditions of irradiation with the laser beam LB. FIG. 7(a) is a diagram related to the melting path. FIG. 7(b) is a diagram related to the stirring path.

It is preferable that a laser output $P_2$ of the second laser beam LB2 in the stirring path is equal to or more than a laser output $P_1$ of the first laser beam LB1 in the melting path (i.e. $P_2 \geq P_1$), taking into account the fact that the molten pool 7 is stirred while the molten state is maintained by the laser output $P_2$. However, it is not particularly limited thereto.

Also, the scanning speed $V_2$ of the second laser beam LB2 in the stirring path is necessarily faster than the scanning speed $V_1$ of the first laser beam LB1 in the melting path (i.e. $V_2 > V_1$), taking into account the fact that it is necessary to stir the molten pool 7 at high speed in order to break and miniaturize the relatively large bubbles B1 as described above.

Also it is preferable that a melting radius $R_2$ that is a radius of a melting area MA2 in the stirring path shown in FIG. 7(b) is 1.2 times or less a melting radius $R_1$ that is a radius of a melting area MA1 in the melting path shown in FIG. 7(a) (i.e. $R_2 \leq 1.2 \times R_1$). In other words, it is preferable that the scanning is performed in such a manner that the molten pool 7 is not unnecessarily expanded. The purpose of the stirring path is to miniaturize the relatively large bubbles B1 generated in the melting path. Therefore, in the stirring path for miniaturizing the bubbles B1, it is not preferable to make a large number of bubbles B1 and B2 newly appear in the molten pool 7 due to the largely expanded molten pool 7 (because a large amount of aluminum alloy cast plate 20 is newly molten). In consideration of the above, it is preferable that the melting radius $R_2$ in the stirring path is equal to the melting radius $R_1$ in the melting path (i.e. $R_2 = R_1$), if possible.

Furthermore, it is preferable that a scanning radius $r_2$ of the second laser beam LB2 in the stirring path is larger than the scanning radius $r_1$ of the first laser beam LB1 in the melting path (i.e. $r_2 > r_1$). In other words, it is preferable that the second laser beam LB2 is emitted outside the scanning locus of the first laser beam LB1 (i.e. the laser scanning area LA1). The bubbles B1 that become the relatively large blow holes BH1 at the time of congelation of the molten pool 7 are likely to concentrate at the solid-liquid interface, i.e. the interface where the molten pool 7 comes into contact with the aluminum alloy cast plate 20. Therefore, when a laser scanning area LA2 of the second laser beam LB2 that stirs the molten pool 7 is set outside the laser scanning area LA1 of the first laser beam LB1, it is possible to effectively break and miniaturize the relatively large bubbles B1 that are likely to concentrate at the solid-liquid interface.

In addition, if the spot diameter of the second laser beam LB2 is set, for example, smaller than the spot diameter of the first laser beam LB1, the molten pool 7 is not largely expanded even when the second laser beam LB2 is emitted outside the scanning locus of the first laser beam LB1. Thus, the condition $r_2 > r_1$ does not contradict prevention of expansion of the molten pool 7. In consideration of the above, the relationship between the melting radius $R_2$ and the scanning radius $r_2$ is preferably expressed by $0.5 \times R_2 \leq r_2 \leq R_2$, and further preferably, by $0.8 \times R_2 \leq r_2 \leq R_2$.

—Effects—

As described above, with the laser welding method of this embodiment, the molten pool 7 is scanned and irradiated, concentrically, with the second laser beam LB2 at the scanning speed $V_2$ faster than the scanning speed $V_1$ of the first laser beam LB1, accordingly, the molten pool 7 is also stirred at a relatively high speed. Thus, the relatively large bubbles B1 that appear in the molten pool 7 are broken and miniaturized. Therefore, it is possible to prevent generation of the relatively large blow holes BH1 in the welding part 3 at the time of congelation of the molten pool 7, which can also prevent degradation of the quality (shear strength and the like) of the welding part 3.

Furthermore, unlike the method in which the laser beam LB is continuously emitted in order to ensure the period of time for discharging the bubbles B1 and B2 from the molten pool 7, in the method of this embodiment, the molten pool 7 is stirred at a relatively high speed so as to miniaturize the bubbles B1. Thus, it is not necessary to wait for the bubbles B1 and B2 to be discharged from the molten pool 7, which contributes to prevention of reduction in productivity.

Also, the scanning is performed with the second laser beam LB2 for stirring the molten pool 7 in such a manner that the molten pool 7 is not expanded. Thus, it is possible to miniaturize the relatively large bubbles B1 while preventing a large number of bubbles B1 and B2 from newly appearing in the molten pool 7.

Furthermore, the second laser beam LB2 for stirring the molten pool 7 is emitted outside the scanning locus of the first laser beam LB1. Thus, it is possible to effectively break and miniaturize the relatively large bubbles that are likely to concentrate at the solid-liquid interface.

Also, in a situation where the bubbles B1 that become the relatively large blow holes BH1 at the time of congelation of the molten pool 7 are likely to concentrate at the solid-liquid interface, this embodiment does not include a path in which the part inside the scanning locus of the first laser beam LB1 and the scanning locus of the second laser beam LB2 is irradiated with the laser beam LB. That is, the irradiation with the laser beam LB, which hardly contributes to miniaturization of the bubbles B1, is not performed. Thus, it is possible to reduce work hours and to improve work efficiency.

Test Example

Here, a description is given on a test example that was performed in order to confirm the effects provided by the laser welding method of this embodiment.

Figure 8:
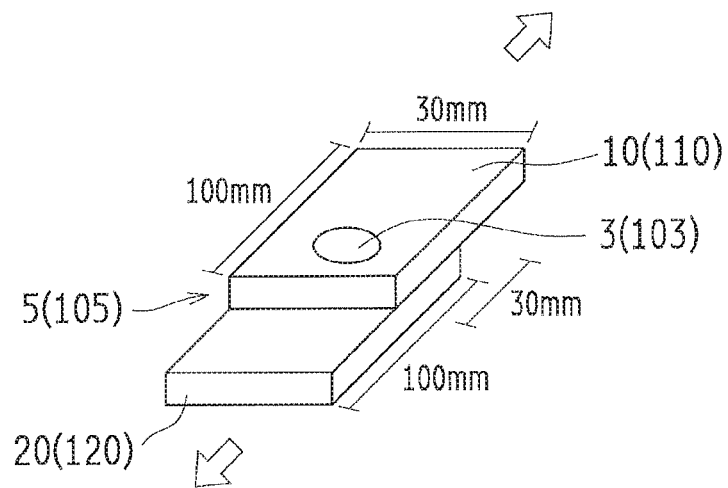
FIG. 8 is a perspective view schematically illustrating a specimen used in a test example.

As shown in FIG. 8, in the test example, a specimen was produced by welding the aluminum alloy plate 10 (110) to the aluminum alloy cast plate 20 (120) by lap welding. Specifically, the specimen was produced by the following steps: overlapping the aluminum alloy plate 10 (110) with the aluminum alloy cast plate 20 (120), both having the width of 30 mm and the length of 100 mm, such that a square area 30 mm on a side was made as a superimposed area, i.e., completely superimposing the plates 10 (110) and 20 (120) in the width direction and furthermore superimposing respective areas of the plates 10 (110) and 20 (120) with the length of 30 mm from the respective edges in the longitudinal direction; irradiating a central part of the superimposed part 5 (105) with the laser beam LB. When irradiation was performed with the laser beam LB, in the example of the present invention, both the melting path and the stirring path were performed, while in a comparative example, only the melting path was performed.

The respective joints produced by the above-described methods were subjected to the tensile shear test in accordance with Japanese Industrial Standards (JIS) Z3136 so as to measure the tensile shear strength (TSS). The tensile direction in the tensile shear test is indicated by the outlined arrows in FIG. 8.

Figure 9:
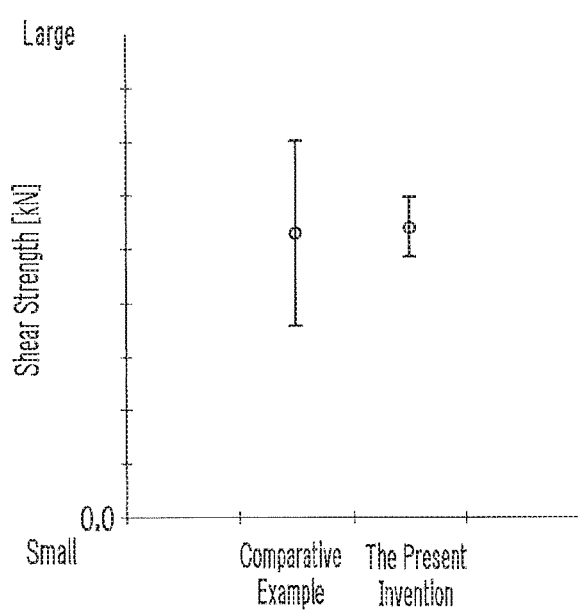
FIG. 9 is a graph indicating test results.

FIG. 9 is a graph indicating test results. In FIG. 9, vertical lines (errors) each indicate the range of three times a standard deviation, and circle marks each indicate an average value of the shear strength. As shown in FIG. 9, in the conventional example, the remaining amount of relatively large blow holes BH1 caused variations in the strength of the welding part 103. In contrast, in the example of the present invention by the laser welding method of this embodiment, there was almost no variation in the shear strength of the welding part 3. In other words, it was confirmed that this embodiment could reduce the influence of the blow holes BH1 on the quality.

Figure 10:
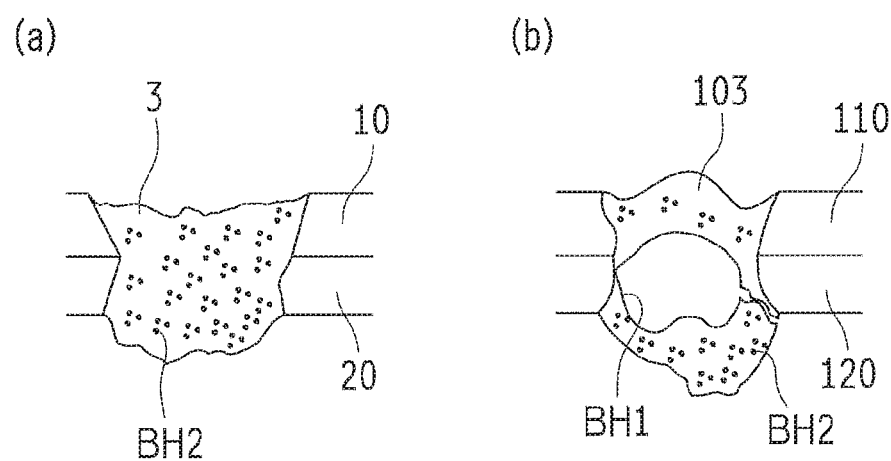
FIG. 10 are diagrams each schematically illustrating an example of the cross-section of the specimen used in the test example.

FIG. 10 are diagrams each schematically illustrating an example of the cross-section of the specimen used in the test example. FIG. 10(a) is a cross-section in the example of the present invention. FIG. 10(b) is a cross-section in a comparative example. As shown in FIG. 10(b), in the conventional example, it was confirmed that the relatively large blow hole BH1 remained in the welding part 103. In contrast, in the example of the present invention by the laser welding method of this embodiment, it was confirmed that only the relatively small blow holes BH2 remained in the welding part 3, as shown in FIG. 10(a).

Other Embodiments

The present invention is not limited to the above embodiment. The present invention may be embodied in other forms without departing from the gist or essential characteristics thereof.

Figure 11:
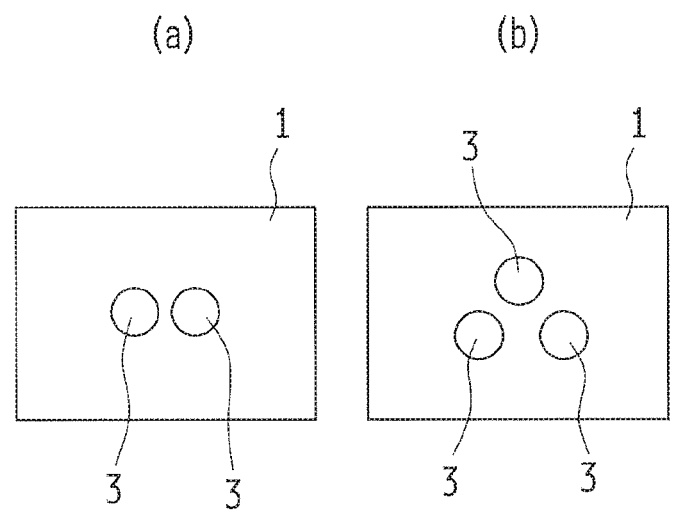
FIG. 11 are diagrams each schematically illustrating the laser welding method in another embodiment.

In the above embodiment, one welding part 3 is formed in one joining part 1. However, the present invention is not limited thereto, provided that the welding part 3 is formed by the melting path and the stirring path. For example, in one joining part 1, two welding parts 3 may be formed as shown in FIG. 11(a) or three welding parts 3 may be formed as shown in FIG. 11(b), by a method so-called "Atomized Laser Screw Welding" (ALW). In this way, it is possible to further reliably reduce the variations in the strength of the joining part 1.

The above embodiment is therefore to be considered in all respects as illustrative and not limiting. All modifications and changes that come within the meaning and range of equivalency of the claims are intended to be embraced therein.

INDUSTRIAL APPLICABILITY

With the present invention, it is possible to prevent generation of relatively large blow holes in a welding part while reducing decrease in productivity. Thus, the present invention is suitably applied to a laser welding method for lap welding, using the laser beam, of a plurality of metal plates including at least one aluminum alloy casting.

REFERENCE SIGNS LIST

5 Superimposed part
7 Molten pool
10 Aluminum alloy plate (metal plate)
20 Aluminum alloy cast plate (aluminum alloy casting)
LB1 First laser beam
LB2 Second laser beam
$V_1$ Scanning speed
$V_2$ Scanning speed

What is claimed is:

1. A laser welding method for lap welding a plurality of metal plates including at least one aluminum alloy casting, the method comprising:
    a melting step of scanning and irradiating circularly a superimposed part made by superimposing the plurality of metal plates with a first laser beam to form a molten pool made from the plurality of metal plates; and
    a stirring step of scanning and irradiating circularly the molten pool with a second laser beam having a scanning speed faster than a scanning speed of the first laser beam to stir the molten pool, wherein
    a laser output of the second laser beam is greater than a laser output of the first laser beam,
    a scanning locus of the second laser beam is emitted outside an outermost circumference of a scanning locus of the first laser beam, and
    the second laser beam emitted outside the outermost circumference of the scanning locus of the first laser beam is also emitted to the molten pool formed inside the outermost circumference of the scanning locus of the first laser beam.

2. The laser welding method according to claim 1, wherein
    the scanning is performed with the second laser beam in such a manner that the molten pool is prevented from being expanded.

3. The laser welding method according to claim 1, wherein
    a part inside the scanning locus of the first laser beam is not irradiated by the second laser beam.

4. The laser welding method according to claim 1, wherein
    the plurality of metal plates is constituted of an aluminum alloy cast plate and an aluminum alloy plate, and
    a gas solubility in the aluminum alloy plate is smaller than a gas solubility in the aluminum alloy cast plate.

5. The laser welding method according to claim 1, wherein
    the second laser beam is emitted to a solid-liquid interface where the molten pool comes into contact with the plurality of metal plates.

6. The laser welding method according to claim 1, wherein
    a radius of a melting area formed by the second laser beam is equal to the radius of the melting area formed by the first laser beam.

* * * * *